Nov. 8, 1938.    C. S. HAZARD    2,135,576
AUXILIARY POWER DRIVE
Filed March 5, 1936
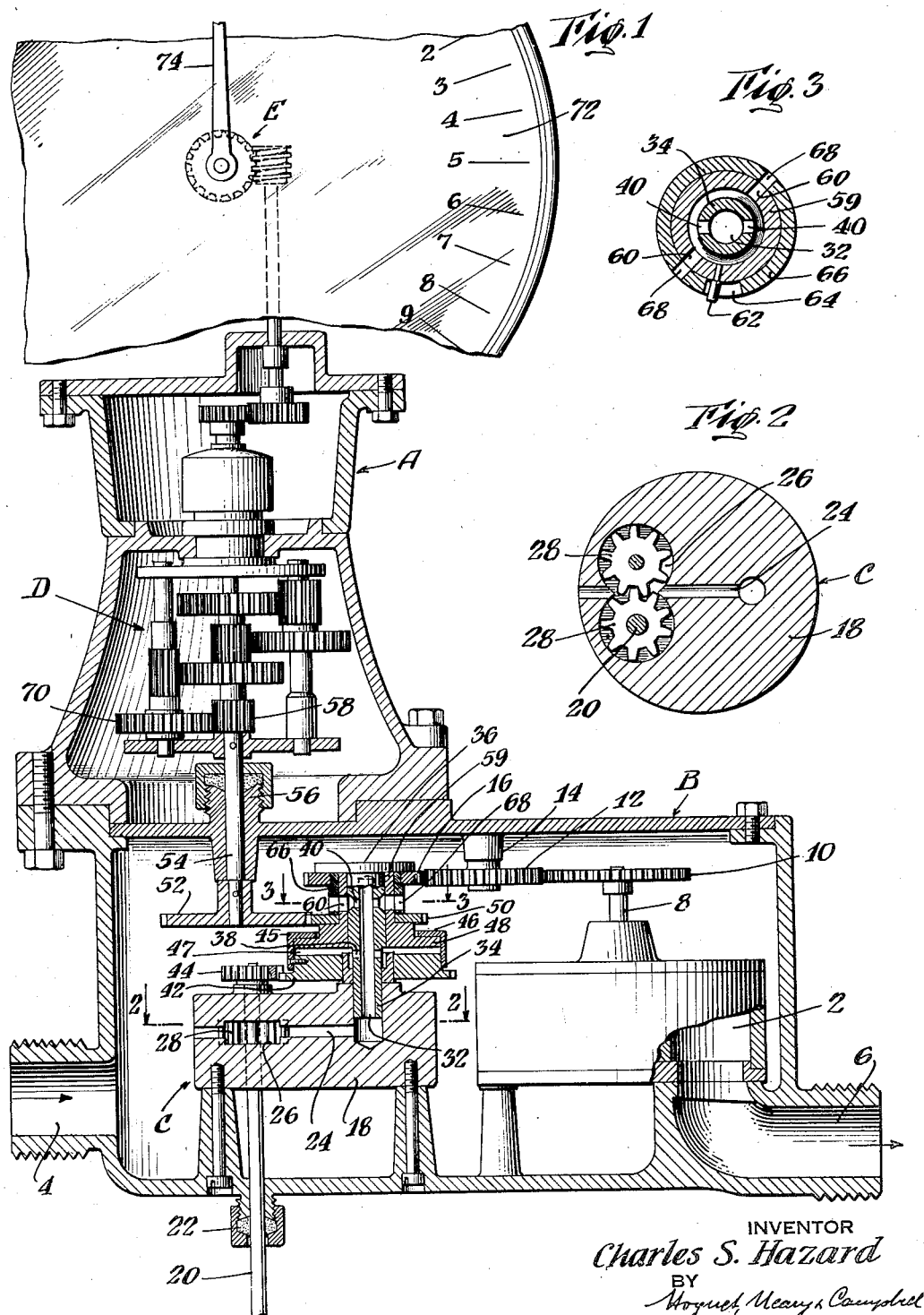
INVENTOR
Charles S. Hazard
BY
ATTORNEYS Patented Nov. 8, 1938

2,135,576

UNITED STATES PATENT OFFICE 2,135,576

AUXILIARY POWER DRIVE

Charles S. Hazard, New York, N. Y., assignor to Neptune Meter Company, a corporation of New Jersey Application March 5, 1936, Serial No. 67,242

7 Claims. (Cl. 73—232)

The present invention relates to an auxiliary drive through which may be supplied additional power to aid feeble power impulses in operating devices which otherwise can not be operated by such feeble impulses.

Metering devices such as shown in United States patent, No. 1,922,071, have been supplied heretofore with additional power means to drive the register, where the power generated in the meter itself by passage of the fluid therethrough is insufficient to otherwise drive the register.

Other types of devices are also known wherein additional driving means are provided for supplying additional power. For example, in the control of guns of large calibre where the usual manually-operated mechanism is insufficiently powerful to move the gun tube, auxiliary means either hydraulically or electrically driven are provided which are controlled by manually-operated means.

Each of the foregoing types of auxiliary power devices are specific to the purposes mentioned, however, and may not readily be adapted without substantial change for other uses, thus the meter drive disclosed in United States patent, No. 1,922,071, could not be used for a gun control mechanism, and a gun control mechanism could not be used in connection with a meter.

In accordance with the present invention an auxiliary drive unit is provided, by means of which a feeble movement may be utilized to control the effective operation of a more powerful force and, through this control means, to cause the more powerful force to operate a device in accordance with the feeble movement.

More specifically, my auxiliary drive unit includes a friction clutch which is engageable in response to variations in fluid pressure determined by the feeble movement to be reproduced, this clutch being disposed between an auxiliary source of power and the device to be driven. The operation of the clutch is controlled by a valve mechanism connected jointly to the source of the feeble movement to be reproduced and the "driven device" in such a manner that the feeble source is enabled to drive the device. The valve device is not, however, intended to act as a driving connection but serves as a control medium for varying the fluid pressure on the clutch to thereby vary the pressure between the clutch elements and thus regulate the amount of power supplied to the driven device by the auxiliary source of power.

The elements of the auxiliary drive unit are so related that the auxiliary source of power normally tends to operate faster than the feeble source of power, thus always tending to run ahead of the latter. Because of the arrangement of the valve control means and its operation by the feeble source of power, the friction between the clutch elements is so regulated that a certain amount of slippage occurs between the clutch elements with the result that the full effect of the auxiliary source of power is not ordinarily applied to the driven device. When the feeble source of power tends to lag behind the driven device and the auxiliary source of power, the valve is opened, thereby decreasing the fluid pressure between the clutch elements and causing the frictional engagement therebetween to become less, so that slippage results and the driven device is operated at decreased speed. When the speed of the driven device falls below that of the feeble source of power, the valve normally tends to close, thereby building up a pressure between the clutch elements, forcing them more firmly into frictional engagement and operating the driven device with a greater portion of power from the auxiliary source. The result is that the source of feeble power merely acts as a governor for synchronizing the driven device with the operation of the source of feeble power, and the auxiliary source of power supplying all the needed energy for operating the driven device.

It will be seen that the auxiliary drive unit of the present invention is susceptible to many uses and without alteration can be used in connection with meter drives, power brakes, gun control mechanisms, power steering apparatus by merely using it as a booster for the relatively feeble power output of a meter, or manually operated means such as hand cranks, hand operated levers or foot pedals.

As a specific example of a use of which my invention is susceptible, I have illustrated my device as being applied to a fluid measuring device in the accompanying drawing in which:

Fig. 1 is a view in elevation, partly broken away and partly in section, of a device embodying my invention.

Fig. 2 is a view in section taken along line 2—2 of Fig. 1.

Fig. 3 is a view in section taken along line 3—3 of Fig. 1.

The fluid measuring device for gasoline or the like, indicated generally as A, includes the housing B enclosing both the fluid meter 2 and the auxiliary drive, which is designated C. The meter 2 may be any well known meter of the oscillating or nutating disk type, but for the purpose of my invention, I prefer to use the type of meter disclosed in United States Patent 1,961,688 or 2,008,500. The housing B is connected through inlet port 4 to a pump of any suitable type for delivering gasoline or other fluid so that the fluid flows through the housing B and meter 2 and out through port 6 to the usual dispensing hose, not shown. Connected to driven shaft 8 of the meter 2 is a gear 10 meshing with idler gear 12 journalled at 14 on housing B, in turn meshing with gear 16 of the auxiliary drive C.

The auxiliary drive C includes the casing 18 through which passes shaft 20 connected to an auxiliary source of power either in the form of a suitable hydraulic or electric motor or to the motor utilized to drive the fluid pump. The shaft 20 passes through a stuffing box 22 in the wall of housing B. The casing 18 is provided with a passage 24 leading to cavity 26, containing gear pump 28 driven by shaft 20 and forcing fluid from the interior of housing B, through passage 24 into the interior 32 of tubular spindle 34 secured in casing 18. Spindle 34 is provided with a head 36 and spaced pairs of lateral ports 38 and 40. Journalled on spindle 34 and meshing with pinion 44 pinned to drive shaft 20 is gear 42 fixedly carrying a collar 45 having the inwardly extending flange 46, this collar 45 forming one element of a friction clutch. Also journalled and freely slidable axially on spindle 34 is the complementary clutch member 48 forming an annular space 47 with gear 42 into which lateral spindle ports 38 lead. Pinned on member 48 is a gear 50 meshing with gear 52 on shaft 54 passing through stuffing box 56 and carrying pinion 58 at its free end. The clutch member 48 is provided with a sleeve 59 having oppositely directed ports 60 aligned with ports 40 in spindle 34 and also having a pin 62 engaging in slot 64 of the hub 66 integral with or fixed to gear 16, allowing limited relative movement between hub 66 and sleeve 59. Hub 66 is provided with oppositely directed ports 68, which register with ports 60 of sleeve 59 when the pin 62 is at one end of the slot 64 as shown in Fig. 3 and which are out of registry with ports 60 when the pin 62 is at the opposite end of slot 64.

Pinion 58 meshes with pinion 70 and through this pinion drives the usual reduction gear train D to operate a register E illustrated as comprising a dial 72 and a movable indicator hand 74. While the register D has been illustrated as a simple dial and hand combination it will be understood that any type of register or recorder suitable for registering or recording fluid measurements can be employed with equal facility.

In operation, with the fluid pump forcing fluid, such as gasoline, through the housing B, and meter 2, and shaft 20 driven by a suitable source of power, the gear 10 will be rotated by meter 2, gear 42 will be rotated by pinion 44 and the gear pump 28 will force fluid through spindle 34. When ports 40, 60 and 68 are in registry as shown in Fig. 1, the fluid flows freely through them, so that there will be no back pressure in space 47 to force member 48 into frictional clutching engagement with flange 46 and so gear 50 will not be driven by the auxiliary source of power. However, as the gear 10 of meter 2 rotates, it rotates idler gear 12 and gear 16 to move port 68 out of registry with port 60, thereby cutting off the flow of fluid therethrough. The gear pump 28 accordingly builds up pressure in spindle passage 32, which is communicated through ports 38 to space 47 to force member 48 into engagement with clutch element 46. The rotation of gears 42 and 44 is accordingly imparted to member 48 and its attached gear 50, so that gear train D and pointer 74 of indicator E are driven. If the shaft 20 drives the shaft 54 at the same rate as the meter shaft 8, all the load of driving the register E is carried thereafter by shaft 20 and auxiliary drive C. If the meter lags, the ports 60—68 will gradually realign and open, permitting the fluid forced by the gear pump 28—28 to pass freely through the ports 60—68, thereby decreasing the pressure between the clutch elements 46—48 and allowing slippage thereof to reduce the speed of rotation of gear 50 to synchronize it with the rotation of gear 16.

When a dispensing operation is terminated and fluid ceases to flow through meter 2, rotation of gear 16 is stopped because the meter acts as a brake thereon. Stoppage of gear 16 immediately opens ports 60—68 relieving clutch 46—48 of fluid pressure. The engagement of pin 62 with the end of slot 64 prevents rotation of gear 50, thereby also stopping the register D.

While my invention has been illustrated as applied to a fluid measuring device, I do not wish it to be so limited as it will be understood that my auxiliary drive can be readily applied to power steering means, power braking means, as a servomotor attachment for all types of devices wherein additional power is required for driving the device, the scope of the invention being defined in the following claims.

I claim:

1. In a device of the type described, a source of feeble movement, a driven device, a drive shaft, a hollow spindle having two spaced outlet ports, means forcing fluid under pressure through said hollow spindle, a pair of fluid operated clutch elements rotatably mounted on the spindle and severally connected to said drive shaft and said driven device, one of said ports leading to the clutch elements, a sleeve on the clutch element connected to said driven device having a port operatively disposed with relation to the other spindle port, and a second sleeve provided with a port and rotatably mounted on the clutch sleeve and connected to said source of feeble movement, whereby relative rotation of the sleeves opens and closes the ports to vary the pressure between the clutch elements and thereby regulate the amount of driving effect transmitted from the drive shaft to the driven device.

2. An auxiliary drive device for use with a feeble source of power, comprising a drive shaft, a driven device, a hollow spindle, pump means actuated by the drive shaft for forcing fluid through the hollow spindle, a clutch element rotatably supported on the spindle and actuated by the drive shaft, a second clutch element supported on the spindle and connected to the driven device, a port in the spindle adjacent the second clutch element, a sleeve connected to the second clutch element, and having a port therein, a second port in the spindle adjacent the sleeve port, a second sleeve connected to the feeble source of power mounted on the spindle and having a port cooperating with the clutch sleeve port for varying the quantity of fluid passing through the ports.

3. In a device of the type described, driving means, a driven device, a source of feeble movement, pump elements operably connected with said driving means, a fluid pressure controlled clutch operatively connecting and disconnecting said driven device and said driving means, valve means, stationary means housing said pump elements and providing communication between said pump elements, said fluid pressure controlled clutch and said valve means, said valve means being controlled by said feeble movement and said driven device for regulating fluid pressure in said clutch whereby said driven device will be driven by said driving means at a rate of speed proportional to the rate of speed of said feeble movement.

4. In a device of the type described, a drive shaft, a driven shaft, a source of feeble movement, a hollow member, a fluid pressure controlled clutch communicating with said hollow member operable to connect and disconnect said drive shaft and said driven shaft, means independent of said clutch for providing a supply of fluid to said hollow member, a valve structure communicating with said hollow member for controlling flow of fluid therefrom, said valve including two relatively movable elements, one of said valve elements being operatively connected to said driven shaft and the other of said valve elements being controlled by said feeble movement.

5. A power drive controlled by a feeble source of power comprising a drive shaft, a driven shaft, a fluid pressure controlled clutch operable to connect and disconnect said drive shaft and said driven shaft, a valve controlled by said feeble source of power and said driven shaft, a pump operatively connected to said drive shaft, stationary means for supporting said pump and providing communication between said pump, said fluid pressure controlled clutch and said valve whereby said driven shaft will be driven by a force in proportion to the strength of said feeble source of power.

6. A power drive controlled by a feeble movement comprising a drive shaft, a driven shaft, a fluid pressure controlled clutch operable to connect and disconnect said drive shaft and said driven shaft, a valve controlled by said feeble movement and said driven shaft, a stationary support, pump means mounted on said stationary support operatively connected to said drive shaft, means providing communication between said pump means, said pressure controlled clutch and said valve whereby said driven shaft will be driven at a speed in proportion to the speed of said feeble movement.

7. A power drive controlled by a feeble movement comprising a driving means including a source of power, a driven device, a hollow member communicating with a source of fluid supply, a fluid pressure controlled clutch communicating with said member operable to connect and disconnect said driving means and said driven device, valve means mounted on said member for controlling the flow of fluid from said member, said valve means including a pair of relatively movable elements, one of said valve elements being operatively connected to said driven device and the other of said valve elements being controlled by said feeble movement whereby said driven device will be driven at a rate in proportion to said feeble movement.

CHARLES S. HAZARD.